United States Patent [19]
Frost et al.

[11] Patent Number: 5,932,329
[45] Date of Patent: Aug. 3, 1999

[54] LAMINATED GLASS PANE WITH IR-REFLECTING PROPERTIES

[75] Inventors: Thorsten Frost, Alsdorf; Heinz Schilde, Wuerselen; Manfred Jansen, Geilenkirchen, all of Germany

[73] Assignee: Saint-Gobain Vitrage, Courbevoie, France

[21] Appl. No.: 08/698,738

[22] Filed: Aug. 16, 1996

[30] Foreign Application Priority Data

Aug. 16, 1996 [DE] Germany .............. 195 29 943

[51] Int. Cl.$^6$ .............. B32B 7/10; B32B 17/10
[52] U.S. Cl. .............. 428/214; 428/215; 428/425.6; 428/436; 428/437
[58] Field of Search .............. 428/213, 214, 428/215, 425.6, 436, 437, 216

[56] References Cited

U.S. PATENT DOCUMENTS 4,855,186  8/1989  Grolig et al. .............. 428/216

*Primary Examiner*—D. S. Nakarani
*Attorney, Agent, or Firm*—Oblon, Spivak, McClelland, Maier & Neustadt, P.C.

[57] ABSTRACT

In a laminated glass pane comprising two glass sheets (1, 2) and a transparent support film (4) having an infra red reflecting surface coating (3), connected to the two glass sheets (1, 2) by adhesive layers (5, 6), the first adhesive layer (5) has a thickness of at most about 50 μm. The second adhesive layer (6) preferably has a thickness of 0.76 mm.

11 Claims, 1 Drawing Sheet

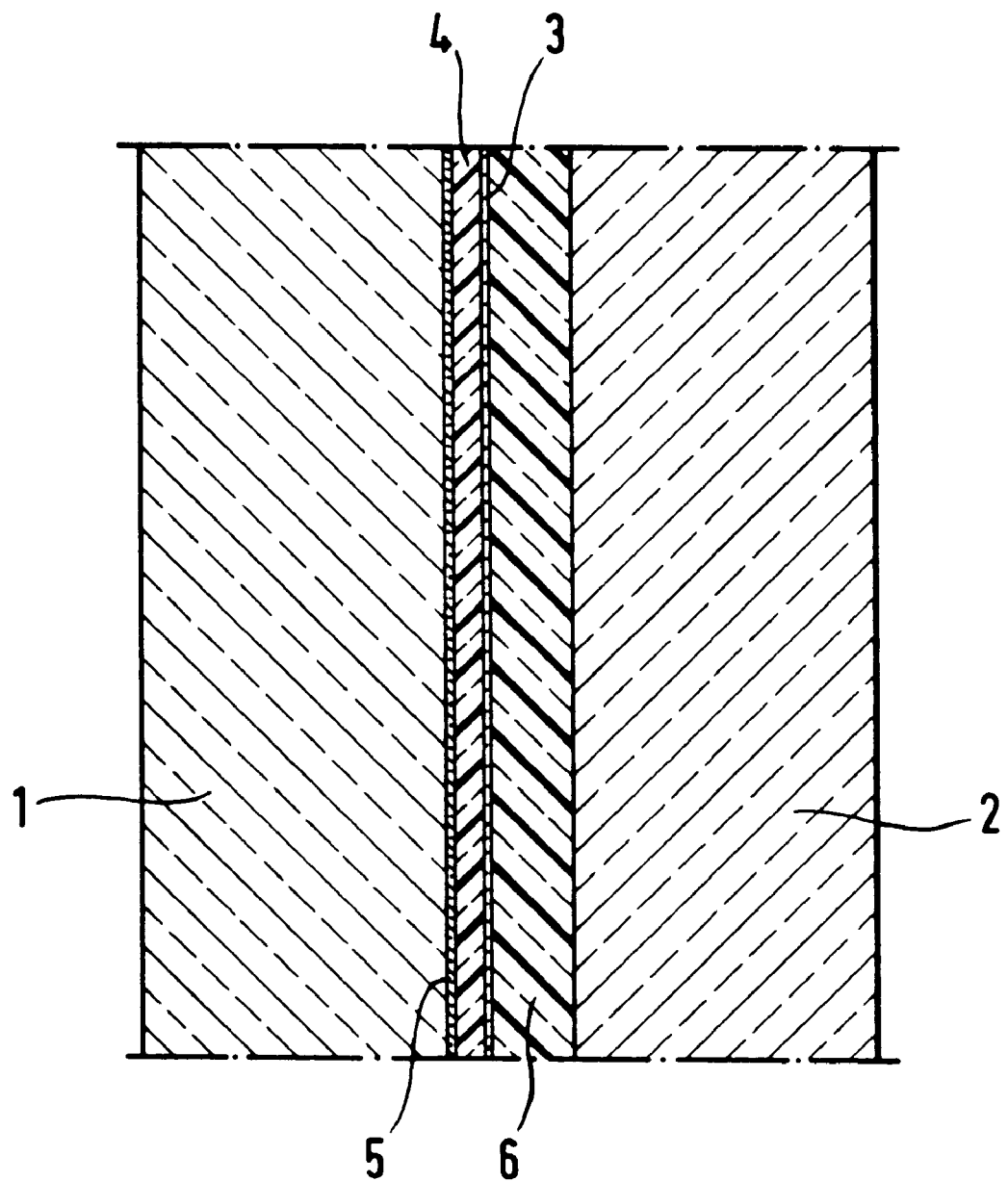

even in this case, in the further processing in the autoclave, polyvinyl butyral bonds directly to the silicate glass sheets.

LAMINATED GLASS PANE WITH IR-REFLECTING PROPERTIES

BACKGROUND OF THE INVENTION

1. Field of the Invention

The present invention relates to an IR-reflecting laminated glass pane having an IR-reflective surface coating on a support film between two glass sheets.

2. Discussion of the Background

In particular, the invention relates to such laminated glass panes suitable as heat-protective panes for automobiles, as are disclosed, for example, in DE 2344616 A1, EP 0371949 A1, EP 0391165 A2, EP 0544717 B1, and U.S. Pat. No. 4,465,736, all of which are incorporated herein by reference in their entirety.

Such laminated glass panes, when subject to oblique incident light, frequently exhibit a disturbing optical quality defect or optical distortion, wherein the IR-reflecting surface does not appear uniform in reflection, but exhibits a shrinkage effect or even a hammering or wrinkling effect. This is well known and described in the literature. It is also known that this hammering effect is apparently the result of shrinkage of a support film and/or thermoplastic adhesive films during heating in the bonding process.

To reduce this annoying optical distortion, support films are proposed in U.S. Pat. No. 4,465,736 which have a very low degree of shrinkage.

In EP 0371949 A1, it is proposed that the aforementioned distortion be avoided by modifying the IR-reflecting surface coating so that reflection in the visible spectral range is limited to at most 2% and preferably less than 0.70%. Modification to the layer caused by shrinkage does indeed persist, but the shrinkage effect is then no longer visible to the eye to a disturbing extent.

EP 0544717 B1 attempts to solve this problem of optical distortion by incorporating special adhesive layers. According to this proposal, the polyvinyl butyral films to be used as special adhesive layers, have on the face in contact with the IR-reflecting coating a small, defined surface undulation pattern.

The prior art methods for avoiding the aforementioned optical distortion have specific disadvantages, and the problem of a hammering effect in laminated glass panes of this category has not been satisfactorily solved.

SUMMARY OF THE INVENTION

Accordingly, an object of the present invention is to provide a laminated glass pane comprising two glass sheets, a transparent, tear-resistant, polymer support film between the two glass sheets, the support film being coated with an IR-reflecting surface coating, and two adhesive layers joining the coated support film to the two glass sheets, wherein optical distortion caused by shrinkage of a polymer layer disposed between the silicate glass sheets can be prevented in a comparatively simple manner.

It has been found and confirmed by experiment that the observed optical distortion is completely or nearly completely avoided if the coated support film is glued on at least one side comparatively firmly to a glass sheet by a very thin adhesive layer. In this manner, the support film can no longer deform or shrink, because this is prevented by the firm bonding to one of the two glass sheets. It is unimportant here whether such shrinkage, which appears to be responsible for the hammering effect, takes place primarily in the coated support film or in the adhesive layers. It is indeed known that polyvinyl butyral films are always subject to internal stresses, and that these films relax and deform when exposed to heat. It is therefore possible that the shrinkage responsible for the effect take place primarily in the polyvinyl butyral films and are transferred to the support film. Distortion effects resulting therefrom are also avoided by the measures according to this invention.

According to the invention, the objective is achieved in that at least one of the adhesive layers has a thickness of at most about 50 $\mu$m.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawing, wherein:

FIG. 1 shows a partial sectional view of a laminated glass pane constructed according to this invention.

DETAILED DESCRIPTION OF THE PREFERRED EMBODIMENTS

An example of an embodiment of the invention is described in more detail below with reference to the drawing.

The composite glass pane comprises the glass sheets 1 and 2, each for example of 3 mm thick float glass, the support film 4, provided with the IR-reflecting surface coating 3, the thin first adhesive layer 5, and a comparatively thick second adhesive layer 6, wherein the adhesive layers 5 and 6 bond the film 4 to glass sheets 1 and 2. The support film 4 is, for example, a film approximately 50 $\mu$m thick of polyethylene terephthalate. The support film 4 is provided on one face with an IR-reflecting multiple layer, the actual functional layer inside the multiple layer including silver. The first adhesive layer 5 joining the support film 4 to the glass sheet 1 is of thermoplastic polyvinyl butyral and has a thickness of 10 $\mu$m. The second adhesive layer 6 on the opposing face of the support film 4 has a thickness of 0.76 mm (i.e., 760 $\mu$m) and also is of thermoplastic polyvinyl butyral.

The coated support film 4 is laminated on one face with the second adhesive layer 6 and is coated on the other face with the first adhesive layer 5 to form a laminate. The laminate is then sandwiched between the glass sheets 1 and 2, placed in an autoclave, and heated to a temperature of 140° C. at a pressure of 12 atmospheres.

The support film for the IR-reflecting surface coating is a polymer, examples of which include, but are not limited to polyester, polycarbonate, cellulose acetate, acrylate or polyvinyl chloride. Preferably, the support film is of polyethylene terephthalate (PET).

The IR-reflecting surface coating may be of various types. Generally common are multiple layers comprising one or more thin silver layers as functional layer, which are embedded between metallic and/or dielectric layers. These layers are preferably applied by magnetic field-assisted cathodic sputtering.

For the production of laminated glass panes, the support films provided with the surface coating are connected to the two glass sheets by two thermoplastic adhesive coatings by the usual laminated glass process. Films of polyvinyl butyral are usually employed as thermoplastic adhesive layers. The thermoplastic polyvinyl butyral films are preferably joined in advance to the coated support film to form a laminate, but the different films can also be prepared separately, and joined together in the production of the laminated glass pane to form one laminated packet. In the actual bonding process, the stack of layers first has the air removed from it and is then pressed together in an autoclave by application of heat and pressure, generally at a temperature of 120 to 150° C. and a pressure of 8 to 15 atm.

In the known laminated glass panes of this category, the polyvinyl butyral films generally used for the two adhesive layers are in the commercially available thickness of 0.38 mm. It has been shown that the purpose aimed at by this invention is also achieved if only the first of the two adhesive layers is extremely thin, while the second adhesive layer is an adhesive foil of commercial thickness. For the second adhesive layer, preferably a polyvinyl butyral film of thickness 0.30 to 1.0 mm, more preferably 0.7 to 0.8 mm, even more preferably 0.76 mm can be used. For example, a total thickness of the polyvinyl butyral layer of 0.76 mm is specified for biomechanical reasons in the case of motor vehicle windshields.

Both for the extremely thin first adhesive layer and for the second adhesive layer, any of the materials known from normal laminated glass can be considered for the adhesive layers. Preferably, thermoplastic material is used, so that the usual production process can be adopted without modification. More preferably, proven materials such as thermoplastic polyvinyl butyrals and thermoplastic polyurethanes are used.

The thickness of the thin first adhesive layer is preferably at most about 50 $\mu$m, more preferably 1 to 30 $\mu$m, even more preferably 5 to 10 $\mu$m. An especially good fixing of the support film to a glass sheet is thus achieved.

Details that are not described herein for the realization of the invention are well-known to the skilled artisan, e.g., the special construction of the IR-reflecting layer, the arrangement of bonding coatings, the composition of the supporting film, and measures for preventing corrosion of the IR-reflecting layer at the edge.

This application is based on DE 195 29 943.4, filed with the German Patent Office on Aug. 16, 1995, the entire contents of which are incorporated herein by reference.

Obviously, numerous modifications and variations of the present invention are possible in light of the above teachings. It is therefore to be understood that, within the scope of the appended claims, the invention may be practiced otherwise than as specifically described herein.

What is claimed as new and is desired to be secured by Letters Patent of the United States is:

1. A laminated glass pane, comprising:
   a) two glass sheets;
   b) a transparent support film of a tear-resistant polymer provided with an IR-reflecting surface coating; and
   c) first and second adhesive layers disposed on opposing surfaces of the coated support film;
   wherein the two glass sheets have disposed between them the coated support film and the first and second adhesive layers, and the coated support film is bonded to the two glass sheets by the first and second adhesive layers; and
   wherein the first adhesive layer has a thickness of at most 50 $\mu$m, and said IR-reflecting layer is deposited on the face of said support film in contact with said second adhesive layer.

2. The laminated glass pane of claim 1, wherein the first adhesive layer has a thickness of 1 to 30 $\mu$m.

3. The laminated glass pane of claim 1, wherein the first adhesive layer has a thickness of 5 to 10 $\mu$m.

4. The laminated glass pane of claim 1, wherein the first adhesive layer has a thickness of 10 $\mu$m.

5. The laminated glass pane of claim 1, wherein the second adhesive layer has a thickness of 0.3 to 0.8 mm.

6. The laminated glass pane of claim 1, wherein the second adhesive layer has a thickness of 0.76 mm.

7. The laminated glass pane of claim 1, wherein the first and second adhesive layers comprise a thermoplastic polymer.

8. The laminated glass pane of claim 7, wherein the thermoplastic polymer is polyvinyl butyral or polyurethane.

9. The laminated glass pane of claim 1, wherein the support film comprises polyethylene terephthalate.

10. The laminated glass pane of claim 1, wherein the IR-reflecting layer comprises multiple layers, wherein one of the layers comprises silver.

11. The laminated glass pane of claim 10, wherein the multiple layers are produced by cathodic sputtering.

* * * * *

UNITED STATES PATENT AND TRADEMARK OFFICE
CERTIFICATE OF CORRECTION

PATENT NO.   : 5,932,329
DATED        : August 3, 1999
INVENTOR(S)  : Frost et al.

It is certified that error appears in the above-identified patent and that said Letters Patent is hereby corrected as shown below:

Column 4,
Line 18, "IR-reflecting layer" should read -- IR-reflecting surface coating --.
Line 39, "IR-reflecting layer" should read -- IR-reflecting surface coating --.

Signed and Sealed this

Nineteenth Day of November, 2002

Attest:

Attesting Officer

JAMES E. ROGAN
Director of the United States Patent and Trademark Office